United States Patent
Dörnhöfer et al.

(10) Patent No.: US 10,247,343 B2
(45) Date of Patent: Apr. 2, 2019

(54) FLUID COUPLING

(71) Applicant: OSCHMANN GBR, Schondorf (DE)

(72) Inventors: Anton Dörnhöfer, Bergkirchen (DE); Hermann Stauff, Willich (DE)

(73) Assignee: Oschmann GBR, Schondorf (DE)

( * ) Notice: Subject to any disclaimer, the term of this patent is extended or adjusted under 35 U.S.C. 154(b) by 31 days.

(21) Appl. No.: 15/100,277

(22) PCT Filed: Oct. 6, 2014

(86) PCT No.: PCT/EP2014/071313
§ 371 (c)(1),
(2) Date: May 27, 2016

(87) PCT Pub. No.: WO2015/082097
PCT Pub. Date: Jun. 11, 2015

(65) Prior Publication Data
US 2017/0002965 A1   Jan. 5, 2017

(30) Foreign Application Priority Data
Dec. 3, 2013 (DE) .................. 10 2013 113 360

(51) Int. Cl.
*F16L 37/32*   (2006.01)
*F16L 37/088*  (2006.01)
*F16L 37/084*  (2006.01)

(52) U.S. Cl.
CPC ............. *F16L 37/32* (2013.01); *F16L 37/084* (2013.01); *F16L 37/088* (2013.01)

(58) Field of Classification Search
CPC ..... Y10T 137/87925; Y10T 137/87933; Y10T 137/87941; Y10T 137/87956;
(Continued)

(56) References Cited

U.S. PATENT DOCUMENTS 2,453,741 A * 11/1948 Bopp .................... F16L 37/133
                                                     137/269
5,402,826 A *  4/1995 Molnar ................. B05B 5/1616
                                                     137/614.01
(Continued)

FOREIGN PATENT DOCUMENTS

DE    7522173 U     1/1976
DE    3440753 A1 *  5/1986 ............ F16L 37/144
(Continued)

OTHER PUBLICATIONS

Machine Translation of DE3440753A1.*

*Primary Examiner* — Michael R Reid
(74) *Attorney, Agent, or Firm* — Themis Law

(57) ABSTRACT

A fluid coupling includes a socket and a plug and is used to connect two fluid hoses, whereby the plug has a neck that can be inserted into the socket with an annular groove for engaging with a locking element. The locking element includes a push-button that can be activated in a radial manner from the exterior of the socket and from which two flexible fork arms protrude that engage into a hub of the socket and have diagonal ramp surfaces on the two opposing inner faces of the fork arms, whereby the diagonal ramp surfaces engage around the neck in the area of the annular groove around a part of the circumference of the neck. The annular groove is delimited by two opposing and diverging diagonal surfaces.

2 Claims, 3 Drawing Sheets

(58) Field of Classification Search
CPC ............ Y10T 137/87965; F16L 37/084; F16L 37/0841; F16L 37/0842; F16L 37/0847; F16L 37/086; F16L 37/088; F16L 37/091; F16L 37/0915; F16L 37/098; F16L 37/0982; F16L 37/0985; F16L 37/0987; F16L 37/1225; F16L 37/1235; F16L 37/133; F16L 37/144; F16L 37/34; F16L 37/32
USPC .......... 285/317; 137/614–614.05; 251/149.1, 251/149.6, 149.9
See application file for complete search history.

(56) References Cited

U.S. PATENT DOCUMENTS

| | | | |
|---|---|---|---|
| 5,806,832 A | 9/1998 | Larbuisson | |
| 2005/0057042 A1* | 3/2005 | Wicks | F16L 37/0841 285/305 |

FOREIGN PATENT DOCUMENTS

| | | |
|---|---|---|
| FR | 2795156 A1 | 12/2000 |
| FR | 2906341 A3 | 3/2008 |
| WO | WO2008153510 A1 | 12/2008 |
| WO | WO2012096143 A1 | 7/2012 |

* cited by examiner

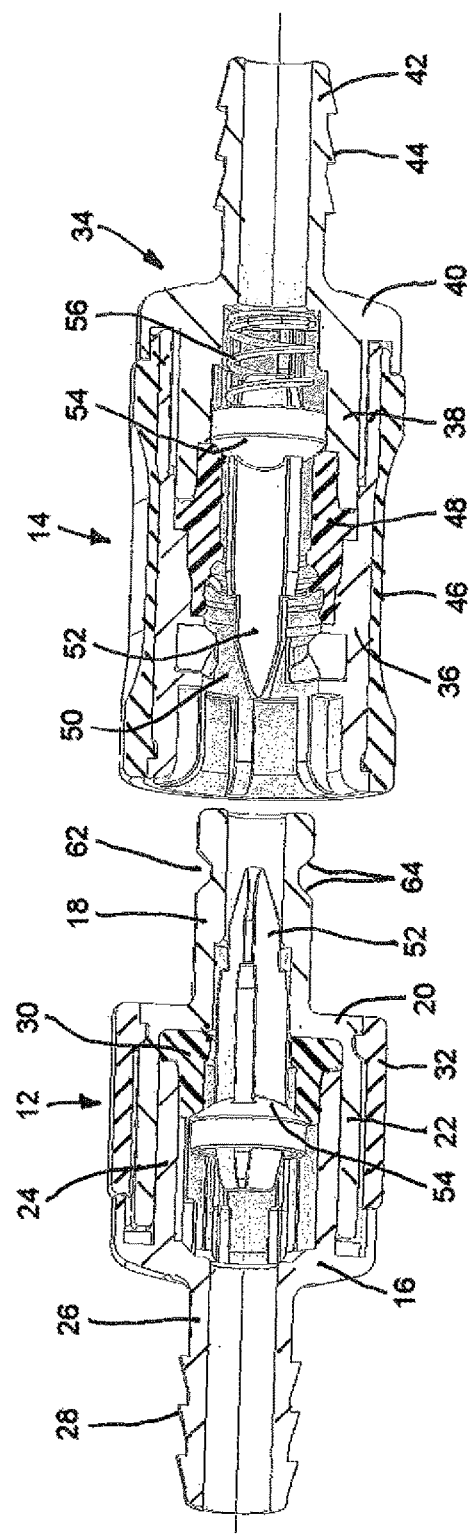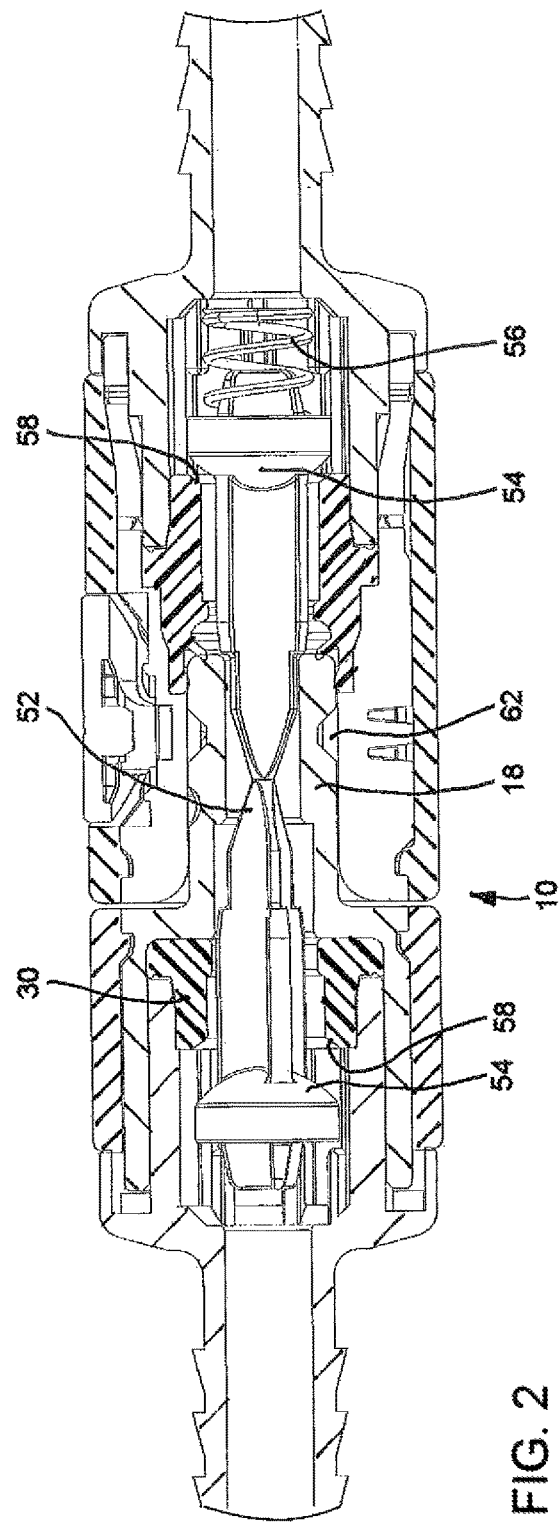
FIG. 1
FIG. 2

FLUID COUPLING

FIELD OF THE INVENTION

The invention relates to a fluid coupling with a socket and a plug for connecting two fluid hoses.

BACKGROUND OF THE INVENTION

Such couplings are particularly suitable for connecting pipe hoses for water with a relatively low pressure of up to 10 bar. To connect the plug and socket, known systems have a coaxial sheath on the socket or on the plug that must be pushed back manually for engaging or disengaging the two coupling halves, which makes the process of coupling and decoupling, respectively, complicated.

SUMMARY OF THE INVENTION

The invention is based on the objective of making available a fluid coupling that provides a simplified operation with only one hand, both for connecting as well as for disconnecting the coupling halves, and that is compatible with most of the popular coupling systems.

The achievement of this objective results from the characteristics described hereinafter.

A significant advantage of the invention compared with the state of the art is that, in order to connect the two coupling halves, these need only be inserted into one another and are self-locking, while the disconnecting process only requires the push-button on the side to be pressed with the thumb.

BRIEF DESCRIPTION OF THE DRAWINGS

The invention is explained below in an illustrated design example. The following are shown:

FIG. 1 A longitudinal section through the coupling in its disengaged state;

FIG. 2 The coupling in its connected and interlocked state;

FIG. 7 The socket in FIG. 6 in its disengaged state with the push-button pushed in.

DETAILED DESCRIPTION OF EMBODIMENTS OF THE INVENTION

As FIGS. 1 and 2 indicate, according to the invention, the coupling, 10, comprises two parts, namely a plug, 12, and a socket, 14, which are both constructed as plastic parts.

The plug, 12, has a cylindrical casing, 16, from which centrally protrudes a cylindrical neck, 18, of a smaller diameter, which is used for engagement with the socket, 14. The casing, 16, is formed in two parts and has a base, 20, projecting from the neck, 18, from which base protrudes a cylinder, 22, which extends over a cylinder, 24, of smaller diameter, from which a connecting piece, 26, with a Christmas-tree profile, 28, protrudes axially, and onto which may be slid a fluid hose (not shown). A stepped annular seal, 30, is fitted into the cylinder, 22, which annular seal is pressed against the base, 20, by the free end of the smaller cylinder, 24. A gripping sleeve, 32, is placed onto the larger cylinder, 22.

The socket, 14, also comprises several plastic parts and has a casing, 34, that is essentially cylindrical with an anterior receiving cylinder, 36, for the neck, 18, of the socket, 12, and one posterior cylinder, 38, with a base, 40, inserted therein and from which protrudes a connecting piece, 42, with a Christmas-tree profile, 41, for a fluid hose.

Here as well, a gripping sleeve, 46, has been placed on the circumferential surface of the socket, 14. An annular seal, 48, has been clamped between the receiving cylinder, 36, and the posterior cylinder, 38, of the casing, 34.

Both in the cavity of the socket, 14, and in the cavity, 50, of the plug, 12, an axially displaceable valve stem, 52, with a calotte bearing, 54, is located, against the concavity of which a compression spring, 56, is propped; FIGS. 1 and 2 show the compression spring for the socket, 14, while it is not further depicted for the plug, 12.

In the disengaged state of the coupling, 10, the two compression springs, 56, which are propped by casing 16 and casing 34, respectively, ensure that the calotte bearing, 54, of the valve stem, 52, is pressed against the appropriate annular seal, 30 or 48, respectively, so that any water present in the plug, 12, and in the socket, 14, cannot flow above the respective connecting piece, 26 or 44, respectively.

When, according to FIG. 2, the coupling, 10, is connected with the socket, 14, by inserting the neck, 18, of the plug, 12, the ends of the two valve stems 52, that are positioned opposite each other are brought to bear against each other and shift axially against the force of the two compression springs, 56. As a result, the two calotte bearings, 54, are lifted off their sealing surfaces, 58, on the annular seal, 30 and 48, respectively, so that the supplied liquid may run off via the connecting piece, 26 or 42, respectively.

Figure 3:
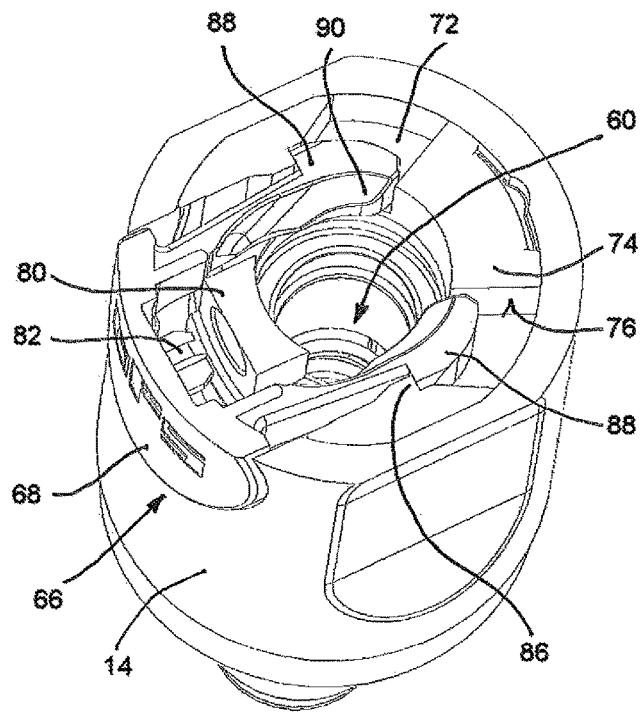
FIG. 3 A scaled perspective representation of the socket.
Figure 5:
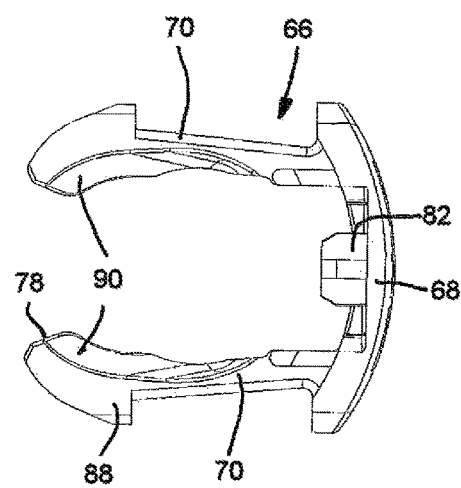
FIG. 5 The push-button outside of the socket.
Figure 6:
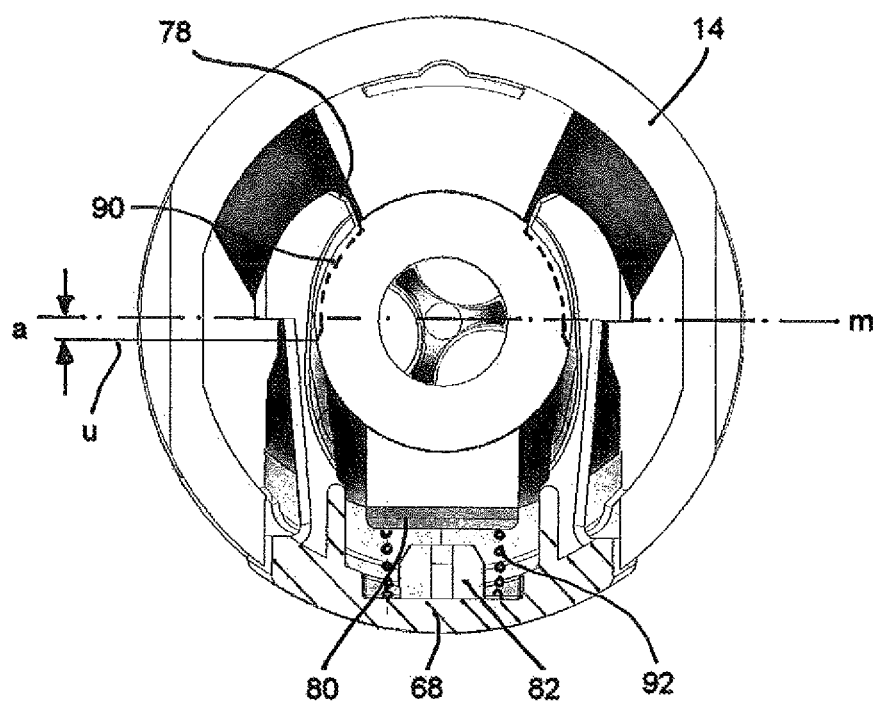
FIG. 6 A top view of the socket with the push-button in the locked setting.
Figure 7:
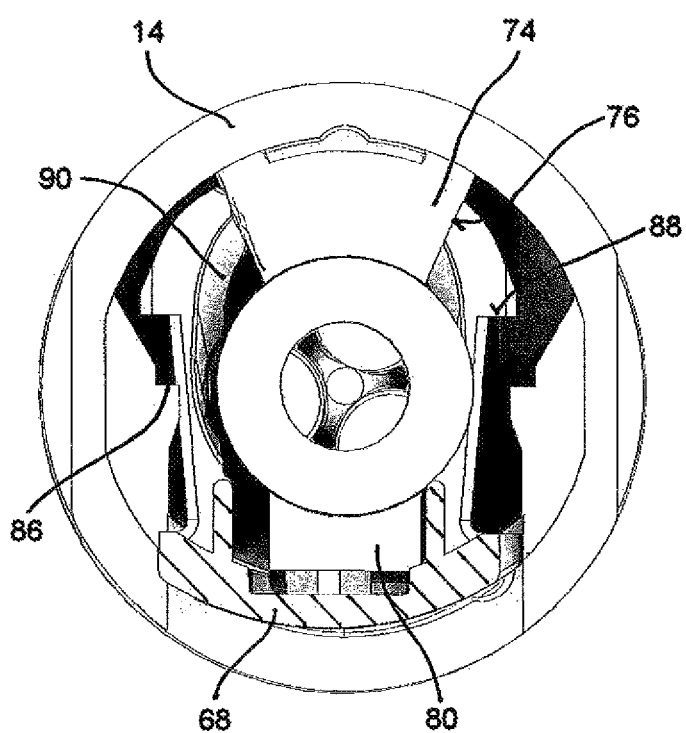

With reference to FIGS. 3 and 7, the construction and operation of the system for locking the plug, 12, and socket, 14, are explained hereinafter according to the invention. In the middle of the socket, 14, a through-bore, 60, is incorporated, into which the neck, 18, of the plug, 12, is sheathed to connect the fluid hoses. The exterior, 14, of the neck comprises an annular groove, 62 (see also FIGS. 1 and 2), which is delimited by two opposing and diverging diagonal surfaces, 64, which are tilted toward the radial plane by 45.degree. The neck, 18, is locked in the bore, 60, of the socket, 14, as shown in FIG. 5, with a locking element, 66, which is made of plastic and comprises a push-button, 68, from which protrude two flexible fork arms, 70. The fork arms, 70, engage into a multi-part hub, 72, of the socket, 14 (see FIG. 3), which is constructed on the free end side of the socket, 14, and which is shown in black in FIGS. 6 and 7. On the side of the socket, 14, that is located opposite the push-button, 68, an abutment projection, 74, protrudes axially, whereby a diagonal expanding surface, 76 is constructed on either side of said expanding surface. On same, the free ends, 78, of the fork arms, 70, come into engagement with the locking element, 66, inserted into the hub, 72. When the push-button, 68, is pressed in order to disengage the plug, 12, from the socket, 14, the free ends, 78, of the fork arms, 70, slide along the two expanding surfaces, 76, and in the process push apart the fork arms, 70. Thus is it possible to disengage the fork arms, 70, from the annular groove, 62, of the neck, 14, so that said neck is automatically disengaged by the pressure from both compression springs, 56, and may be extracted via the bore, 60.

Figure 4:
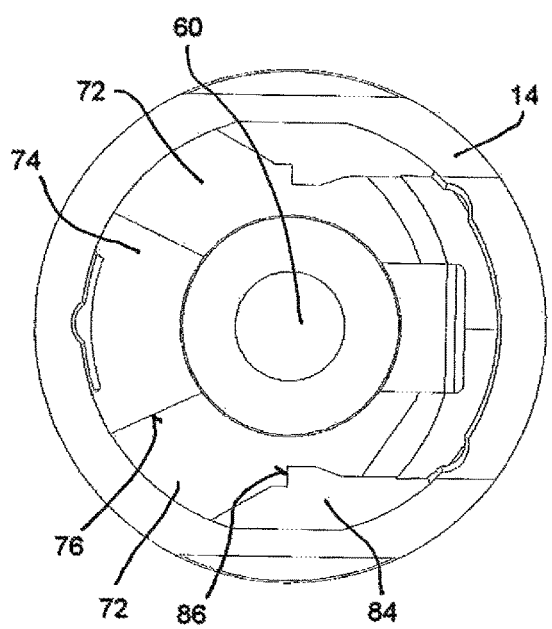
FIG. 4 A top view of the socket in FIG. 3 without the push-button.

When the push-button, 68, is subsequently released again, a return spring inserted between said push-button and an abutment, 80, located opposite an abutment protrusion, 74, ensures that the locking element, 66, with its two fork arms, 70, is pushed back by a return spring, 92, into the starting position of not being pressed. The return spring, 92, is placed on a pin, 82, protruding from the push-button, 68. In order to prevent that the return spring, 92, pushes the push-button, 68, out of its hub, 72, and thus out of the socket 14, two diametrically opposing, axial protrusions, 84, are constructed in the hub, 72 (see FIG. 4, as well as FIGS. 6 and 7), which have two diametrically opposing radial end abutment surfaces, 86, that form a latching step and against which are propped the ends, shaped into barbs, 88, of the two fork arms, 70, when the push-button, 68, is not pressed, i.e., in the locked condition.

In particular, FIGS. 5 and 6 indicate that the fork arms, 70, on both their opposing inner faces, have diagonal ramp surfaces, 90, that engage around the neck 18, of the socket, 12, in the area of its annular groove, 62, around a part of the circumference of same. The diagonal ramp surfaces, 90, are constructed in such a way that they diverge in a trough shape in an axial direction toward the plug, 12. In this manner, a ramp-like guiding surface is formed for the neck, 18 (to be inserted into the socket, 12), which facilitates the insertion of the neck, 18, and the spreading of the two fork arms, 70.

When the neck, 18, has been inserted up to the end abutment according to FIG. 2, whereby the opposing end surfaces of the plug, 12, and the socket, 14, come into contact with each other, the locking element, 66, is pushed out in a radial manner into its starting position (FIG. 6) by the return spring, 92, so that the two fork arms, 70, glide into the annular groove, 62, of the neck, 18. Without actuating the push-button, 68, the two coupling elements, 12 and 14, cannot be disengaged.

It is indicated in FIG. 6 that, in the locked state, the ramp surfaces, 90, constructed on the free ends, 78, of the fork arms, 70, which engage into the annular groove, 62, of the neck, 18, reach at least up to the mid-plane, m, of the neck, 18, or exceed same by a small excess, u, of, for instance, 1 mm. This ensures that if a pull is exerted on the plug, 12, the coupling, 10, will not be automatically disengaged.

The invention claimed is:

1. A fluid coupling for connecting two fluid hoses, the fluid coupling comprising:
   a socket, and
   a plug,
   wherein the plug has a neck, which is adapted to be inserted into the socket, the neck comprising an annular groove for engaging a locking element in the socket,
   wherein the locking element comprises a push-button, adapted to be actuated in a radial direction from an exterior of the socket,
   wherein two flexible fork arms protrude from the push-button and are adapted to engage a hub of the socket, the two flexible fork arms having free ends that are arc-shaped and directed inwardly,
   wherein diagonal ramp surfaces on two opposing inner faces are defined on the flexible fork arms and being adapted to engage around the neck in an area of the annular groove around a lower part of a circumference of the neck in a locked state of the socket with the plug,
   wherein the diagonal ramp surfaces of the fork arms diverge in an axial direction toward the plug,
   wherein the free ends of the two fork arms abut against a diagonal expanding surface of the hub and comprise barbs on their exterior, which, in the locked state and with the push-button not having been actuated, come into contact with latching steps of the hub,
   wherein the latching steps comprise opposing end abutment surfaces, against which the barbs of the fork arms are propped in the locked state,
   further comprising a return spring propped against an interior surface of the push button, the return spring, in the locked state, pushing the push-button outwardly to cause the barbs of the two fork arms against the latching steps and the free ends of the two flexible fork arms to engage the neck of the plug, and
   wherein the annular groove is delimited by two opposing and diverging diagonal surfaces,
   further comprising:
   a first valve stem disposed to slide axially in a cavity of the plug;
   a second valve stem disposed to slide axially in a cavity of the socket, each of the first and second valve stems having a calotte bearing molded thereon; and
   a first compressed spring disposed in the plug and a second compressed spring disposed in the socket, each of the first and the second compressed spring being propped against a respective calotte bearing of the calotte bearing, the first and the second compressed spring, in a disengaged state of socket and plug, pushing a spherical exterior of the respective calotte bearing against a respective annular seal in the plug and in the socket,
   wherein in an engaged state of the plug and the socket, opposing ends of the two valve stems are in contact with each other.

2. The fluid coupling according to claim 1, wherein the two ramp surfaces are defined on free ends of the two fork arms and are adapted to engage into the annular groove, the two ramp surfaces reaching up to a mid-plane of the neck and exceeding the mid-plane in a locked state.

* * * * *